US012134874B2

(12) United States Patent
Jamilosa

(10) Patent No.: US 12,134,874 B2
(45) Date of Patent: Nov. 5, 2024

(54) SNUBBER SYSTEM FOR RETARDING SWINGING MOVEMENT OF DOORS OF DIPPERS

(71) Applicant: Caterpillar Inc., Peoria, IL (US)

(72) Inventor: James Garry Jamilosa, Walpahu, HI (US)

(73) Assignee: Caterpillar Inc., Peoria, IL (US)

( * ) Notice: Subject to any disclaimer, the term of this patent is extended or adjusted under 35 U.S.C. 154(b) by 851 days.

(21) Appl. No.: 17/184,718

(22) Filed: Feb. 25, 2021

(65) Prior Publication Data

US 2022/0267983 A1 Aug. 25, 2022

(51) Int. Cl.
*E02F 3/407* (2006.01)
*E05F 5/02* (2006.01)

(52) U.S. Cl.
CPC ............ *E02F 3/4075* (2013.01); *E05F 5/022* (2013.01); *E05Y 2201/21* (2013.01); *E05Y 2900/518* (2013.01)

(58) Field of Classification Search
CPC . E02F 3/40; E02F 3/407; E02F 3/4075; E02F 3/308; E02F 3/60; E02F 9/00; E05F 5/00; E05F 5/06; E05F 3/14; E05F 3/20
USPC ............................................................ 37/445
See application file for complete search history.

(56) References Cited

U.S. PATENT DOCUMENTS 4,517,756 A * 5/1985 Olds ..................... E02F 3/4075 37/444
5,613,308 A * 3/1997 Little .................... E02F 3/4075 37/444
5,735,067 A * 4/1998 Isley ..................... E02F 3/4075 37/444
5,815,960 A * 10/1998 Soczka ................. E02F 3/4075 37/444
7,096,610 B1 * 8/2006 Gilmore ................ E02F 3/4075 37/445
8,732,994 B2 * 5/2014 Dube .................... E02F 3/4075 37/445
8,959,805 B2 2/2015 Bienfang et al.
(Continued)

FOREIGN PATENT DOCUMENTS

JP 2016030997 A 3/2016

OTHER PUBLICATIONS

Written Opinion and International Search Report for Int'l. Patent Appln. No. PCT/US2021/017197, mailed May 31, 2022 (9 pgs).

*Primary Examiner* — Jamie L McGowan
*Assistant Examiner* — Audrey L Lusk

(57) ABSTRACT

A snubber system for retarding a swinging movement of a door with respect to a body of the dipper. The snubber system includes a braking assembly, an arm structure, and a link structure. The braking assembly is configured to be fixedly mounted to the body. The arm structure is configured to execute rotation about a first axis, the rotation of the arm structure being dampened by the braking assembly. The link structure is rotatably coupled to the arm structure to rotate about a second axis, and is movable in correspondence with the swinging movement of the door to exert and transfer a force to the arm structure. A direction of the force defines an angle between 80-100 degrees with respect to an axis or a plane passing through the first axis and the second axis throughout the swinging movement of the door.

20 Claims, 6 Drawing Sheets

(56) References Cited

U.S. PATENT DOCUMENTS

| | | | |
|---|---|---|---|
| 9,096,992 | B2 | 8/2015 | Gilmore et al. |
| 10,371,225 | B2 | 8/2019 | Popp et al. |
| 2011/0239494 | A1 | 10/2011 | Dubé |
| 2013/0192101 | A1 | 8/2013 | Gilmore |
| 2016/0362869 | A1 | 12/2016 | Bozich |
| 2018/0087593 | A1 | 3/2018 | Popp |

* cited by examiner

SNUBBER SYSTEM FOR RETARDING SWINGING MOVEMENT OF DOORS OF DIPPERS

TECHNICAL FIELD

The present disclosure relates to machines having a dipper to scoop and transfer materials at a worksite. More particularly, the present disclosure relates to a snubber system for retarding a swinging movement of a door of the dipper with respect to a body of the dipper.

BACKGROUND

Shovel machines, such as electric rope shovels, generally utilize a dipper for digging and scooping out a quantity of material from material bank at a worksite (e.g., a mine site). A dipper generally includes a body defining a mouth and a port. The dipper may also include a door that may move (e.g., swing) to open and close the port. In a typical operational cycle, an operator may engage the mouth (e.g., an edge defined by the mouth) against the material bank, scoop in material from the material bank into the body of the dipper, move the dipper over a receptacle (e.g., a dump body of a dump truck), and unlatch the door so that the door swings open to release the material (e.g., under gravity) into the dump body as payload. Thereafter, the door may be returned or swung back so as to close the port. The dipper is then turned again towards the material bank to scoop in a next quantity of material from the material bank.

It is known for such dippers to include a snubber system that impart or provide a dampening action to the swinging movement of the door so as to prevent the door from slamming against the body or against any external structure (e.g., the receptacle) as the door is closing and/or opening. However, with a conventional snubber system, relatively significant portions or components of a force associated with the swinging action of the door is poorly regulated, resulting in an ineffective utilization of a torque capacity and a dampening action of the snubber system. On certain occasions, components of such a force may be also unduly passed to the body and/or the door of the dipper.

U.S. Pat. No. 9,096,992 relates to a dipper assembly that includes a dipper, a dipper door, a closure mechanism, and one or more block assemblies. The dipper door is pivotally mounted to the dipper, and has a closed position in which the dipper door covers the dipper bottom. The closure mechanism has a locked position and an unlocked position, and is coupled to the dipper back and the dipper door. In the locked position, the closure mechanism holds the dipper door in the closed position. In the unlocked position, the closure mechanism allows the dipper door to swing away from the closed position. The block assemblies are coupled to the dipper back and limit a rotation of the side link plate to a predefined angle that corresponds to the closed position.

SUMMARY OF THE INVENTION

In one aspect, the disclosure is directed to a snubber system for retarding a swinging movement of a door of a dipper with respect to a body of the dipper. The snubber system includes a braking assembly, an arm structure, and a link structure. The braking assembly is configured to be fixedly mounted to the body of the dipper. The arm structure is configured to execute a back and forth rotation about a first axis, the back and forth rotation of the arm structure being dampened by the braking assembly. The link structure is rotatably coupled to the arm structure to rotate with respect to the arm structure about a second axis. The link structure is movable in correspondence with the swinging movement of the door and is configured to exert and transfer a force associated with the swinging movement of the door to the arm structure. A direction of the force exerted upon the arm structure by the link structure in response to the swinging movement of the door defines an angle between 80-100 degrees with respect to an axis or a plane passing through the first axis and the second axis throughout the swinging movement of the door.

In another aspect, the disclosure relates to a dipper for a shovel machine. The dipper includes a body, a door, and a snubber system. The body defines a cavity, a first end defining a mouth to receive materials into the cavity, a second end opposite to the first end defining a port to release the materials from the cavity. The door is configured to execute a swinging movement with respect to the body to selectively open and close the port. The snubber system retards the swinging movement of the door with respect to the body. The snubber system includes a braking assembly, an arm structure, and a link structure. The braking assembly is fixedly mounted to the body of the dipper. The arm structure is configured to execute a back and forth rotation about a first axis. The back and forth rotation of the arm structure is dampened by the braking assembly. The link structure is rotatably coupled to the arm structure to rotate with respect to the arm structure about a second axis. The link structure is movable in correspondence with the swinging movement of the door and is configured to exert and transfer a force associated with the swinging movement of the door to the arm structure. A direction of the force exerted upon the arm structure by the link structure in response to the swinging movement of the door defines an angle between 80-100 degrees with respect to an axis or a plane passing through the first axis and the second axis throughout the swinging movement of the door.

In yet another aspect, the disclosure is directed to a machine. The machine includes a main frame, a linkage assembly movably coupled to the main frame, a dipper movably coupled to the linkage assembly and configured to receive materials from a material bank and transfer the materials into a receptacle. the dipper includes a body, a door, and a snubber system. The body defines a cavity, a first end defining a mouth to receive the materials into the cavity, a second end opposite to the first end defining a port to release the materials from the cavity into the receptacle. The door is configured to execute a swinging movement with respect to the body to open and close the port. The snubber system retards the swinging movement of the door with respect to the body. The snubber system includes a braking assembly, an arm structure, and a link structure. The braking assembly is fixedly mounted to the body of the dipper. The arm structure is configured to execute a back and forth rotation about a first axis. The back and forth rotation of the arm structure is dampened by the braking assembly. The link structure is rotatably coupled to the arm structure to rotate with respect to the arm structure about a second axis. The link structure is movable in correspondence with the swinging movement of the door and is configured to exert and transfer a force associated with the swinging movement of the door to the arm structure. A direction of the force exerted upon the arm structure by the link structure in response to the swinging movement of the door defines an angle between 80-100 degrees with respect to an axis or a plane passing through the first axis and the second axis throughout the swinging movement of the door.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts.

Figure 1:
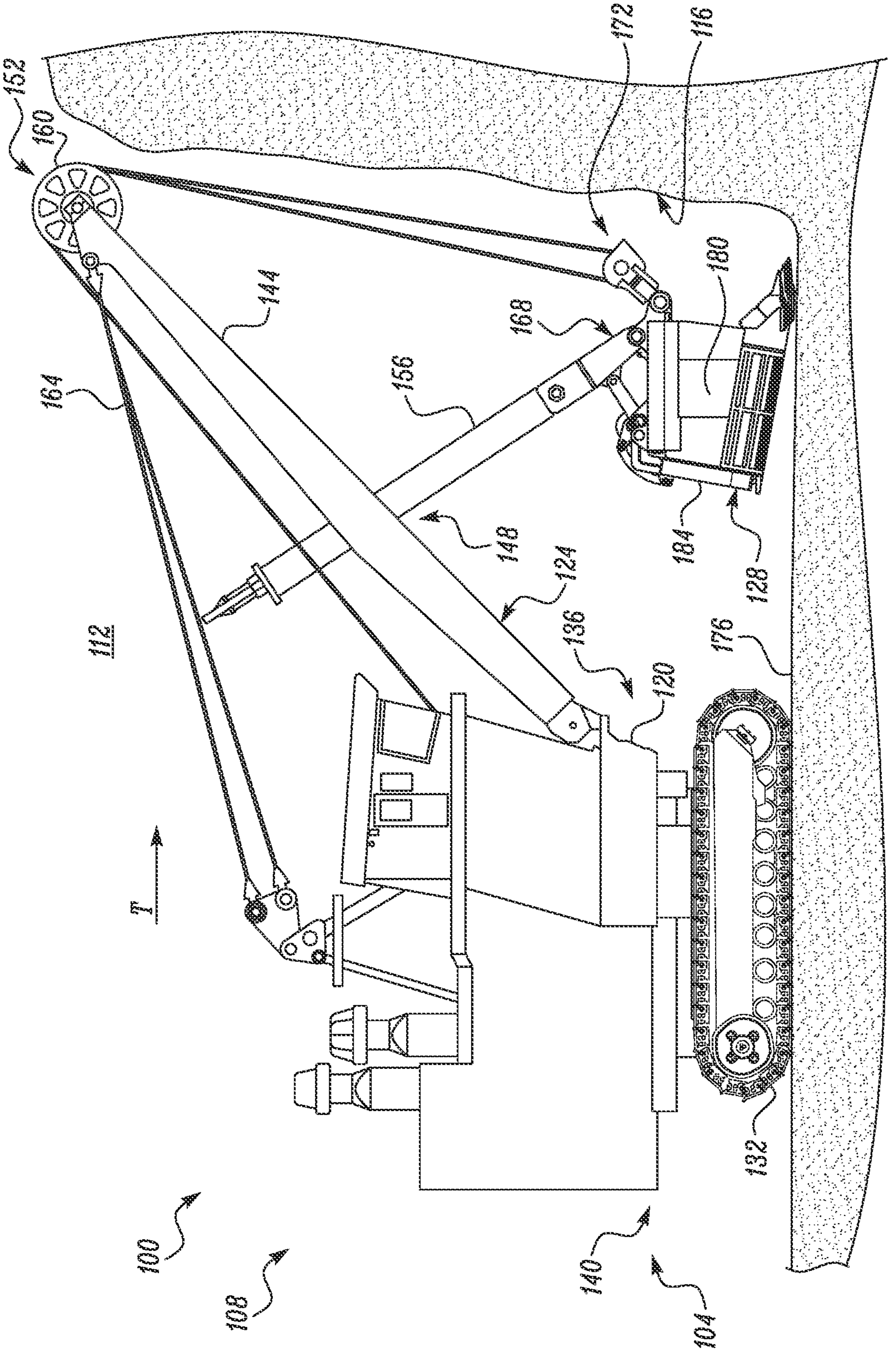
FIG. 1 is a side view of a machine having a linkage assembly and a dipper, in accordance with an aspect of the present disclosure.
Figure 2:
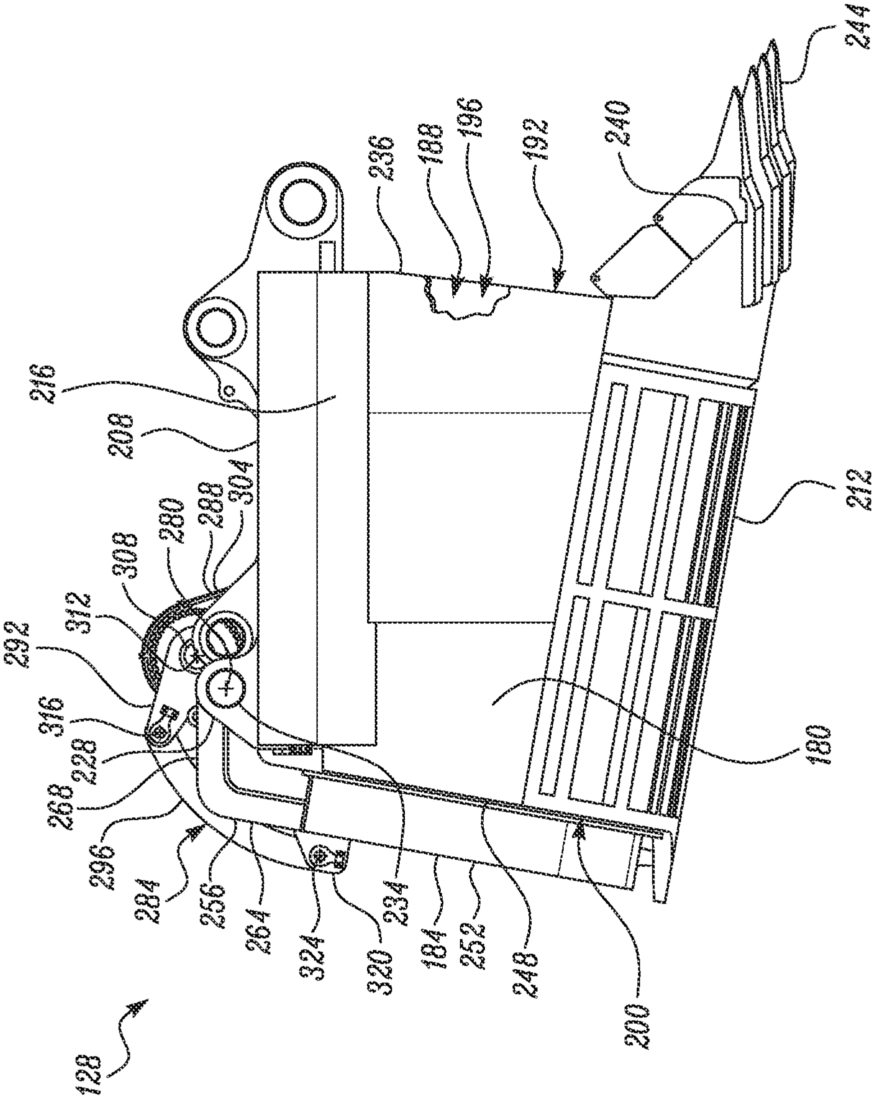
FIGS. 2 and 3 illustrate a door of the dipper between a closed state and an open state and also illustrate a snubber system applied to retard a swinging movement of the door between the closed state and the open state, in accordance with an aspect of the present disclosure.
Figure 3:
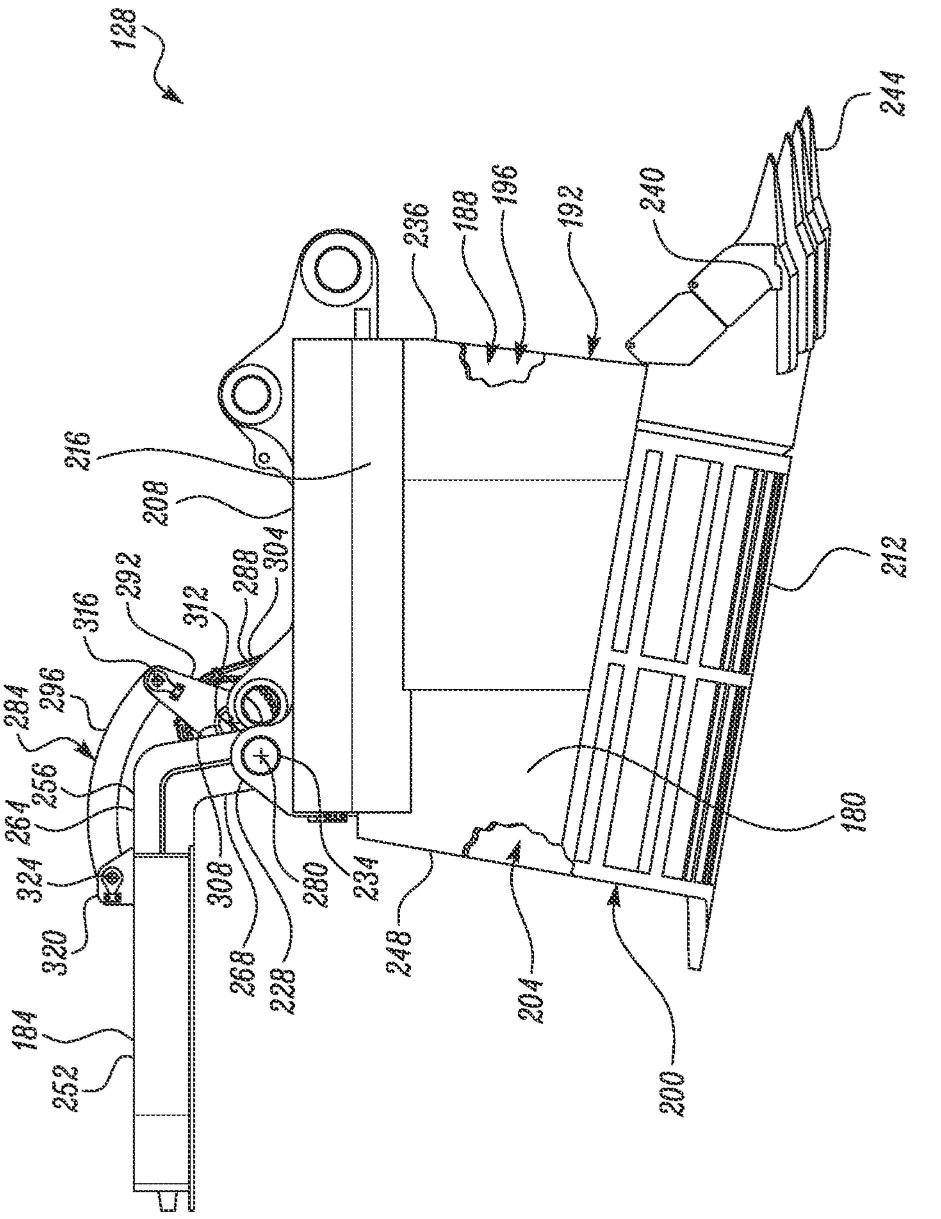

Referring to FIG. 1, a shovel machine 100 is shown. The shovel machine 100 may include a rope shovel machine 104, such as one which may be operated and powered electrically and/or by way of combusting a fuel. For ease, the shovel machine 100 may be simply referred to as a machine 108, hereinafter. The machine 108 may be applied at a work site 112, such as in a mining environment, e.g., a mine site, to scrape and scoop material from a material bank 116 and transfer the scooped material into a receptacle (e.g., into a dump body of a dump truck) (not shown). Such a receptacle may be disposed adjacent to the machine 108 during a scooping and material transferring operation. The machine 108 may include a main frame 120, a linkage assembly 124, and a dipper 128. Aspects of the present disclosure may be applied to other machines, such as excavators, as well.

The main frame 120 may be supported on traction devices 132 (only one of the traction devices 132 is visible in FIG. 1). The traction devices 132 may enable the machine 108 to travel from one location at the work site 112 to another location at the work site 112. The traction devices 132 may include wheels, crawler tracks, either alone or in combination with each other. At least one traction device may be provided on each side of the machine 108. In some embodiments, the main frame 120 may be rotatably supported on the traction devices 132, to allow the main frame 120 and various components coupled to the main frame 120 to rotate with respect to the traction devices 132 and execute the scooping and material transferring operation. Further, the main frame 120 may define a forward end 136 and a rearward end 140.

The forward end 136 and the rearward end 140 may be understood based on an exemplary direction of travel (see direction, T) in which the machine 108 may execute motion over and along an expanse of the work site 112, with the direction of the travel, T, being defined from the rearward end 140 towards the forward end 136. The travel of the machine 108 may be enabled by way of a propelling action of the traction devices 132, and the traction devices 132 may be in turn powered by a power source (e.g., an electrical power source or a fuel based power source or both).

The linkage assembly 124 may be coupled (e.g., pivotably coupled) to the forward end 136 of the main frame 120 of the machine 108. To this end, the linkage assembly 124 may include a boom 144 coupled (e.g., pivotably coupled) and extending upwardly and outwardly from the forward end 136 of the main frame 120. The machine 108 may also include a crowd mechanism 148 and a hoist mechanism 152 provided on the boom 144. The crowd mechanism 148 may include a handle 156 that may be configured to slidably move with respect to the boom 144. The hoist mechanism 152 may include a winch (not shown), a pulley 160, and a hoist cable 164 which may be coupled to the winch and which may go around the pulley 160, as shown.

The dipper 128 may be pivotably coupled to an end 168 of the handle 156 and may be configured to receive and hold earth (and/or other materials) during the scooping and material transferring operation. Further, an end 172 of the hoist cable 164 may extend over the pulley 160 and may be coupled to the dipper 128. Based on a rotation of the winch, the hoist cable 164 may retract or extend relative to the winch to raise or lower the dipper 128 with respect to a ground 176 on which the machine 108 may travel and operate. Moreover, the dipper 128 may extend or retract relative to the boom 144 based on the sliding movement of the handle 156 with respect to the boom 144. The dipper 128 may include a body 180 and a door 184.

Referring to FIGS. 1 to 4, the body 180 of the dipper 128 may define a cavity 188, a first end 192 defining a mouth 196 (see FIGS. 2 and 3) to receive the materials into the cavity 188, and a second end 200 opposite to the first end 192 defining a port 204 (see FIG. 3) to release the materials from the cavity 188. The body 180 defines a first outer surface portion 208 and a second outer surface portion 212, each disposed at least partially around the cavity 188. The second outer surface portion 212 may be located opposite to the first outer surface portion 208, and each of the first outer surface portion 208 and the second outer surface portion 212 may extend between the mouth 196 and the port 204 or between the first end 192 and the second end 200. Further, a first lateral side surface portion 216 and a second lateral side surface portion 220 (see FIG. 4) may extend between the mouth 196 and the port 204, or between the first end 192 and the second end 200, as well. The first lateral side surface portion 216 and the second lateral side surface portion 220 may be disposed opposite to each other and may integrally connect the first outer surface portion 208 and the second outer surface portion 212 to each other.

Combinedly, the first outer surface portion 208, the second outer surface portion 212, the first lateral side surface portion 216, and the second lateral side surface portion 220, may be an integral and a contiguous structure defined around the cavity 188 of the dipper 128. Also, combinedly, the first outer surface portion 208, the second outer surface portion 212, the first lateral side surface portion 216, and the second lateral side surface portion 220, may impart a generally cuboidal shape or profile to the overall structure of the body 180 of the dipper 128 and to the cavity 188 defined within the body 180 of the dipper 128. Further, a set of hinge brackets (e.g., a first hinge bracket 228 and a second hinge bracket 232) (also see FIG. 4) may be provided (e.g., fixedly mounted) on the first outer surface portion 208.

According to one aspect of the present disclosure, the body 180 defines a first edge 236 at the first end 192 to define the mouth 196 at the first end 192. A portion 240 of the first edge 236 may accommodate one or more protruded members 244 that may be assembled or integrally formed with the body 180 at said portion 240 of the first edge 236 to serve as a set of teeth. The protruded members 244 may be applied to engage the material bank 116 and scoop in a portion of material from the material bank 116 into the cavity 188, during the scooping and material transferring operation. Further, according to one aspect of the present disclosure, the body 180 may define a second edge 248 at the second end 200 to define the port 204 at the second end 200.

The door 184 is configured to execute a swinging movement with respect to the body 180 to selectively open and close the port 204. In one instance, the door 184 may be moved away from the second edge 248 to an open state (see FIG. 3) to open the port 204, and, in another instance, the door 184 may be moved to come in contact with the second edge 248 to a closed state (see FIG. 2) to close the port 204. Therefore, the swinging movement of the door 184 may be understood to be executable in one or both a clockwise direction and a counter-clockwise direction between the closed state and the open state. To execute the swinging movement, the door 184 may be pivotably coupled to the body 180 (e.g., to the first outer surface portion 208 of the body 180) and a suitable pivoting mechanism (exemplarily discussed below) may facilitate the opening and the closing of the door 184 with respect to the body 180 of the dipper 128. The door 184 may define a side surface portion 252 extending along a direction defined between the first outer surface portion 208 and the second outer surface portion 212 when the door 184 is moved to the closed state (FIG. 2) to close the port 204. Although not limited, the side surface portion 252 of the door 184 may define a generally planar profile.

Figure 4:
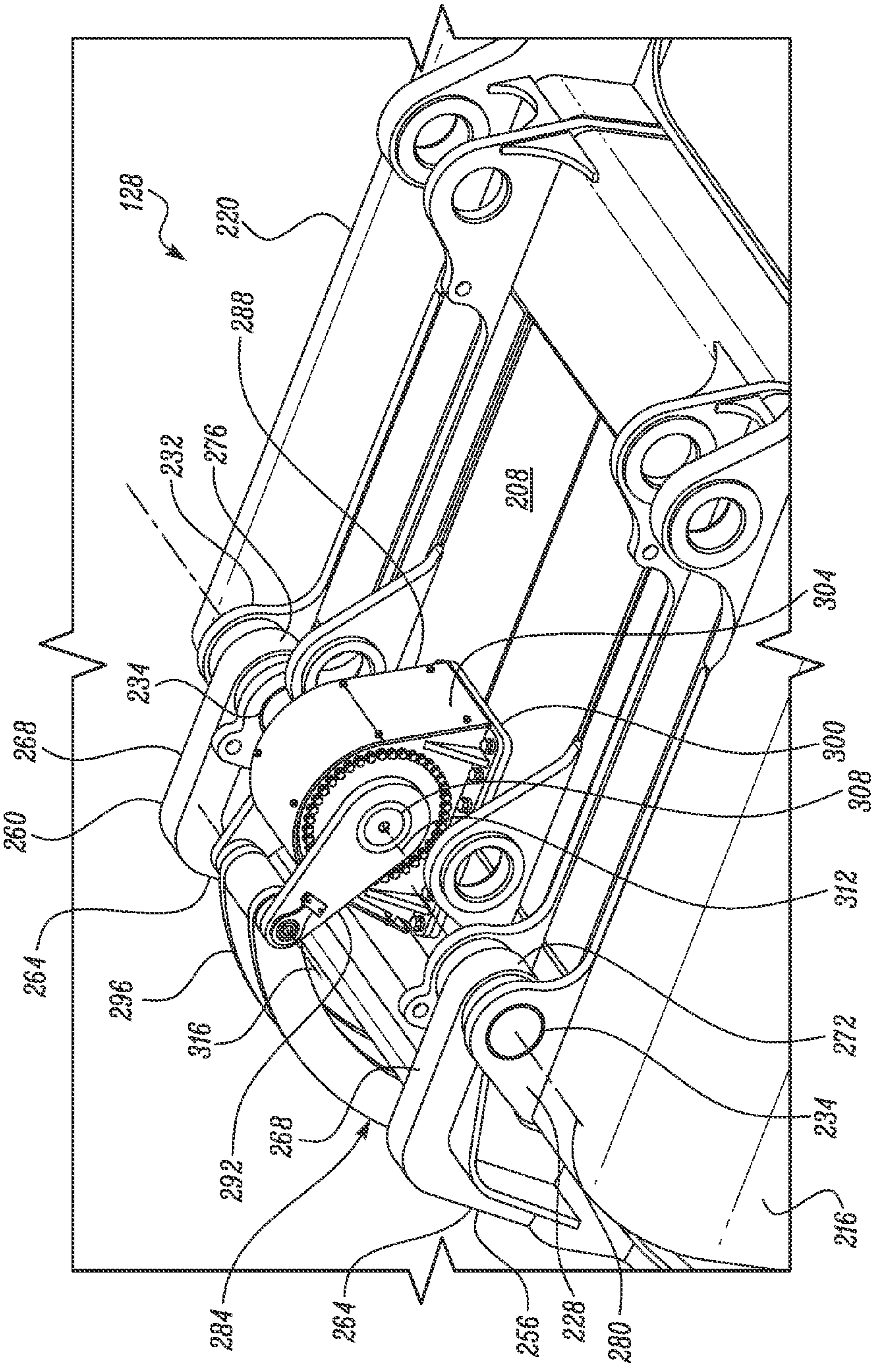
FIG. 4 is a partial isometric view of the dipper illustrating certain details of the snubber system and the dipper, in accordance with an aspect of the present disclosure.

With regard to the pivoting mechanism between the door 184 and the body 180, the door 184 may be pivotably coupled to the body 180 (e.g., to the first outer surface portion 208 of the body 180) by way of a pair of L-shaped hinge members (e.g., a first L-shaped hinge member 256 and a second L-shaped hinge member 260) (also see FIG. 4). Each of the first L-shaped hinge member 256 and the second L-shaped hinge member 260 may include a first stem portion 264 and a second stem portion 268—where the first stem portions 264 of the first L-shaped hinge member 256 and the second L-shaped hinge member 260 may extend (e.g., in the same direction) along the planar profile defined by the door 184, while the second stem portions 268 of the first L-shaped hinge member 256 and the second L-shaped hinge member 260 may be correspondingly bent with respect to the first stem portions 264 of the first L-shaped hinge member 256 and the second L-shaped hinge member 260. In some embodiments, the second stem portions 268 of the first L-shaped hinge member 256 and the second L-shaped hinge member 260 may correspondingly extend orthogonally to the first stem portions 264 of the first L-shaped hinge member 256 and a second L-shaped hinge member 260.

The second stem portions 268 may each define a hinge end (e.g., a first hinge end 272 and a second hinge end 276) (see FIG. 4). Although not limited, each of the first L-shaped hinge member 256 and the second L-shaped hinge member 260 may be integrally formed with a remainder of a body of the door 184. The first hinge end 272 may be aligned with the first hinge bracket 228 and the second hinge end 276 may be aligned with the second hinge bracket 232, in an assembly of the door 184 with the body 180. Further, corresponding rotation members (such as pins 234) may be passed through the assembly of the first hinge end 272 and the first hinge bracket 228 and through the assembly of the second hinge end 276 and the second hinge bracket 232, in order to define the pivoting mechanism between the door 184 and the body 180. In some embodiments, the door 184 may pivot with respect to the body 180 about an axis (referred to as a fourth axis 280, hereinafter, for understanding one or more aspects of the present disclosure). In some embodiments, said fourth axis 280 may extend (e.g., orthogonally) between the first lateral side surface portion 216 and the second lateral side surface portion 220.

According to one or more aspects of the present disclosure, a snubber system 284 for the dipper 128 is disclosed. The snubber system 284 may be applied for retarding a swinging movement of the door 184 of the dipper 128 with respect to the body 180 of the dipper 128. The snubber system 284 includes a braking assembly 288, an arm structure 292, and a link structure 296, details related to each of which shall be discussed below.

The braking assembly 288 may be disposed in between the first hinge bracket 228 and the second hinge bracket 232. For example, the braking assembly 288 may include a base 300 (FIG. 4) that may be fixedly mounted to the first outer surface portion 208 of body 180 of the dipper 128. The braking assembly 288 may include an outer housing 304 and a dampening member 308 (e.g., a shaft) that may be rotatable with respect to the outer housing 304. A rotation of the dampening member 308 (e.g., the shaft) may be dampened by way of a suitable dampening mechanism disposed within the outer housing 304. As an example, the dampening mechanism may be fluid based, where, for example, a portion of a fluid when transferred from one chamber to another (within the outer housing 304) may result in dampening of a rotation of the dampening member 308—e.g., when rotating in either directions (clockwise or counter-clockwise). Such a dampening mechanism, and other such mechanisms, are well known to those with ordinary skill in the art, and thus shall not be discussed further. An ensuing dampening action may be applied to retard a swinging movement of the door 184 of the dipper 128 with respect to the body 180 of the dipper 128, and the manner of such application will be understood from the disclosure further below.

The arm structure 292 may be coupled (e.g., fixedly coupled) to the dampening member 308. In that manner, the arm structure 292 may be rotatable with respect to the outer housing 304 of the braking assembly 288. For example, the arm structure 292 may be configured to execute a back and forth rotation with respect to the outer housing 304 of the braking assembly 288. With the arm structure 292 being coupled to the dampening member 308, and since a rotation of the dampening member 308 is dampened by the dampening mechanism, said back and forth rotation of the arm structure 292 may be dampened by the braking assembly 288, as well. In some embodiments, an axis about which the arm structure 292 rotates may be one and the same axis about which the dampening member 308 rotates. Said axis may be referred to as the first axis 312. Further, in some embodiments, the rotation of the dampening member 308 may be restricted within an angular range. In so doing, the arm structure 292 may also be able to execute the back and forth motion (e.g., rotation) within a corresponding angular range, so as to span through and define a sector of a circle during its rotation about the first axis 312.

Referring to FIGS. 2 to 6, the link structure 296 may be rotatably coupled to the arm structure 292 to rotate (e.g., freely rotate) with respect to the arm structure 292 about a second axis 316. Further, the link structure 296 may be pivotably or rotatably coupled to the side surface portion 252 of the door 184, as well, and may be rotatable with respect to the door 184 about a third axis 324, as shown. For example, the link structure 296 may be pivotably coupled to the side surface portion 252 by way of a mounting bracket 320 arranged on the side surface portion 252 of the door 184.

By way of such coupling, the link structure 296 may comply with the swinging movement of the door 184 and may receive a force, F, (see FIG. 5) from the door 184 during the swinging movement of the door 184. Effectively, the link structure 296 may be movable in correspondence with the swinging movement of the door 184 and may also be configured to exert and transfer the force, F, associated with the swinging movement of the door 184 to the arm structure 292.

According to an aspect of the present disclosure, a direction of the force, F, exerted upon the arm structure 292 by the link structure 296 in response to the swinging movement of the door 184, defines an angle (A) with respect to an axis 326 or a plane 328 (see FIGS. 5 and 6) passing through the first axis 312 and the second axis 316 throughout the swinging movement of the door 184. The angle (A) may be between 80-100 degrees—see FIGS. 2 and 3 in conjunction along with FIG. 5 in which angle (A) is depicted. In this regard, the description further below discusses one exemplary configuration and/or a layout of the snubber system 284 that helps maintain said angle (A) between 80-100 degrees throughout the swinging movement of the door 184. Said layout and/or configuration is discussed by way of a schematic line diagram 332.

Figure 5:
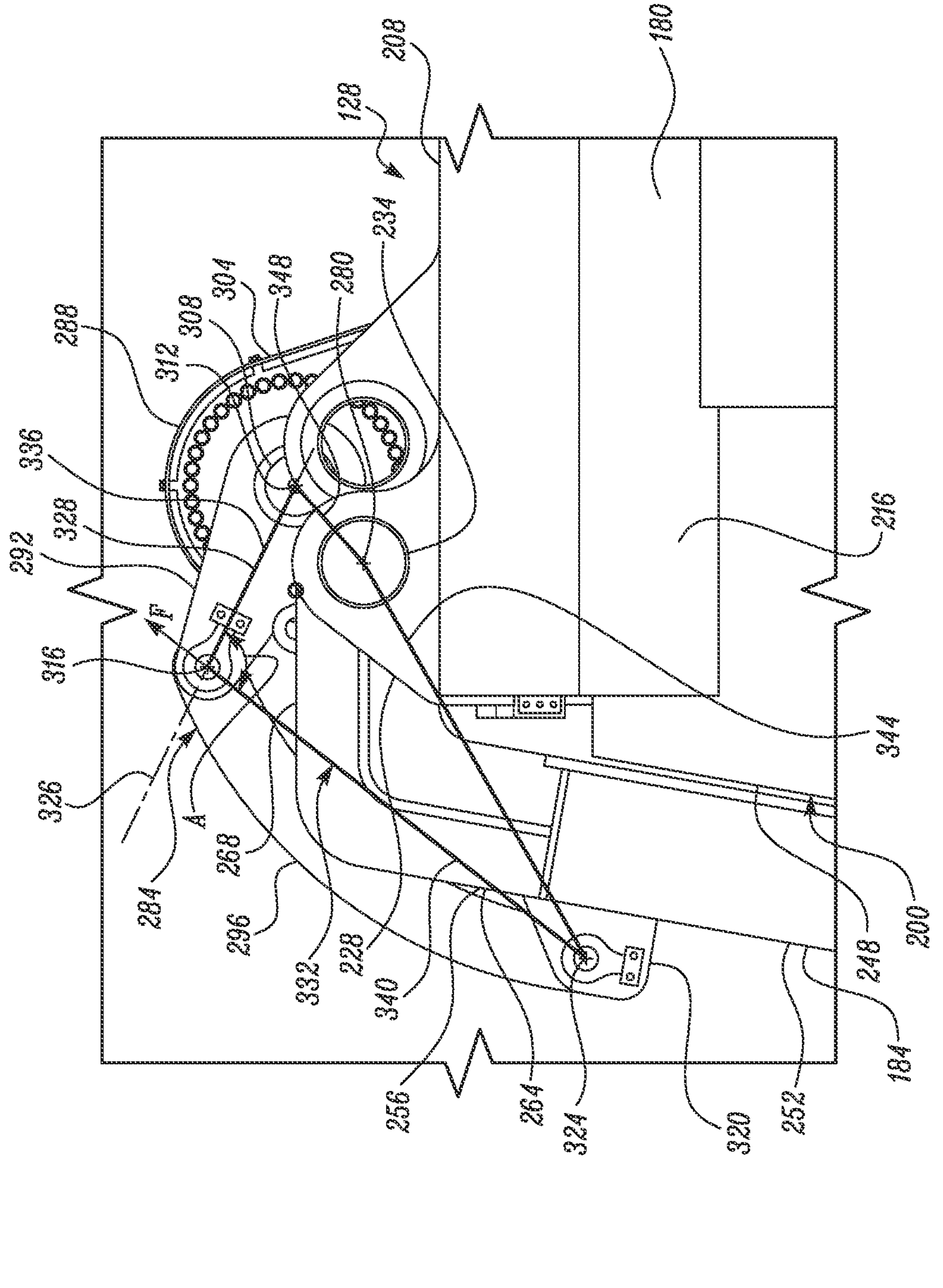
FIGS. 5 and 6 are various views of an exemplary configuration and/or a layout of the snubber system illustrated by way of a schematic line diagram, in accordance with an aspect of the present disclosure.
Figure 6:
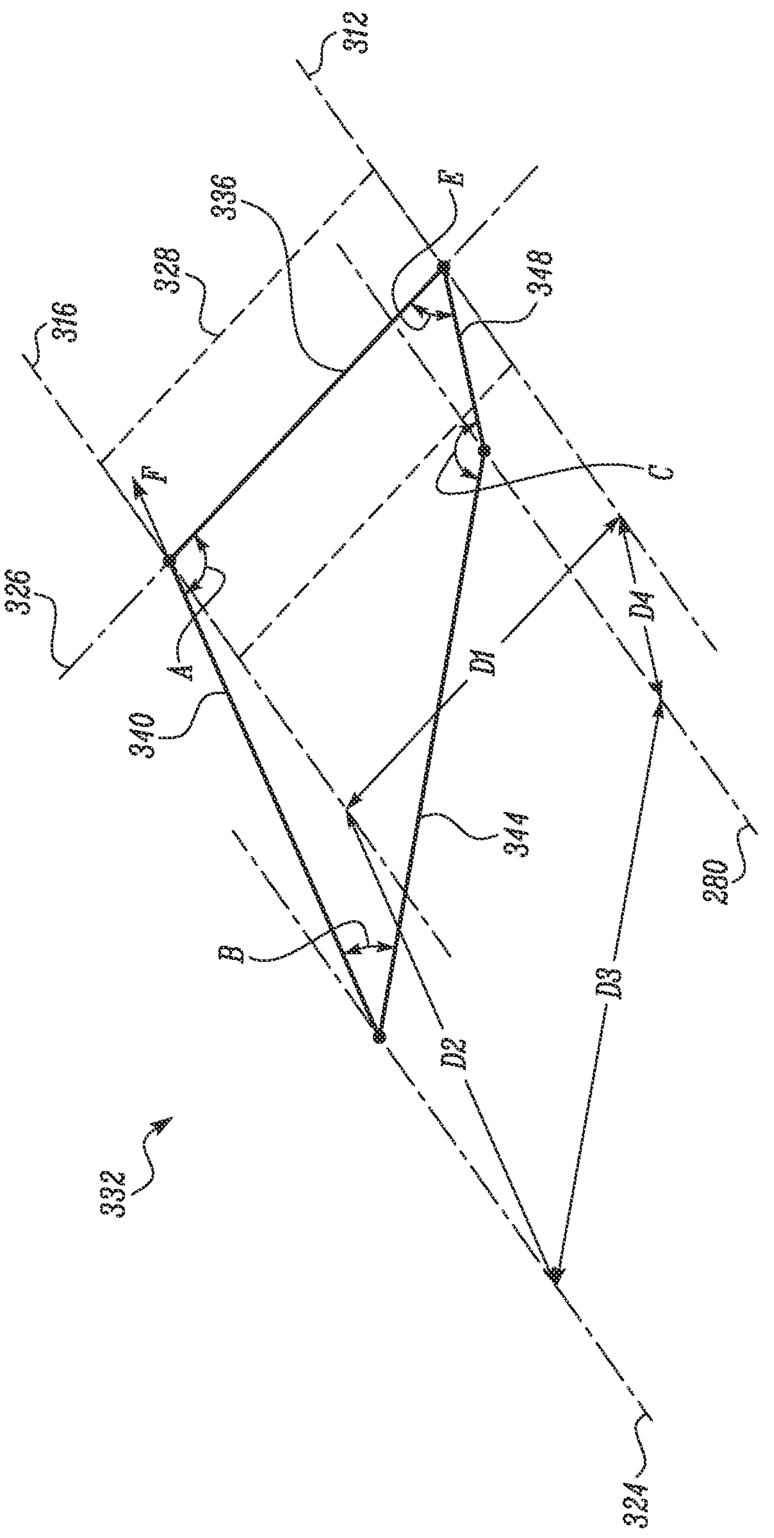

As shown in FIGS. 5 and 6, the schematic line diagram 332 is discussed—in FIG. 6, to aid visualization, the schematic line diagram 332 it slightly tilted with respect to its orientation in FIG. 5 to provide a perspective view of the plane 328 and the direction or action of the force, F, in relation to the plane 328. The schematic line diagram 332 illustrates each of the axes 280, 312, 316, 324, as has been discussed above. As may be noted, the schematic line diagram 332 also illustrates multiple reference lines that are shown to extend between the axes 280, 312, 316, 324. Further, by way of said schematic line diagram 332, the direction of the force, F, exerted upon the arm structure 292 by the link structure 296 in response to the swinging movement of the door 184 may also be visualized. To further understand the schematic line diagram 332 and the exemplary configuration of the snubber system 284, following conditions may be exemplarily considered—each of the first axis 312, the second axis 316, the third axis 324, and the fourth axis 280, may be parallel to each other, and may define respective distances therebetween. For example, a first distance D1 may be defined between the first axis 312 and the second axis 316, a second distance D2 may be defined between the second axis 316 and the third axis 324, a third distance D3 may be defined between the third axis 324 and the fourth axis 280, and a fourth distance D4 may be defined between the fourth axis 280 and the first axis 312.

The first distance D1 may be defined along a first reference line 336 (disposed along the axis 326 or in the plane 328) that orthogonally extends between the first axis 312 and the second axis 316; the second distance D2 may be defined along a second reference line 340 (along which the force, F, is defined) that orthogonally extends between the second axis 316 and the third axis 324; the third distance D3 may be defined along a third reference line 344 that orthogonally extends between the third axis 324 and the fourth axis 280; and the fourth distance D4 may be defined along a fourth reference line 348 that orthogonally extends between the fourth axis 280 and the first axis 312. Understandably, the third distance D3 may vary as the door 184 executes the swinging movement between the open state and the closed state. Further, each of the first reference line 336, second reference line 340, third reference line 344, and the fourth reference line 348 may be disposed in a common plane.

According to the exemplary configuration of the present disclosure, the second distance D2 may be more than twice the first distance D1, and the fourth distance D4 may be shorter than the first distance D1. Further, when the door 184 is moved to a closed state to close the port 204, the first distance D1 and the fourth distance D4 may be both shorter than each of the second distance D2 and the third distance D3, the third distance D3 may be more than twice the first distance D1, and the third distance D3 may be shorter than the second distance D2.

According to a further example, in the closed state of the door 184, the first distance D1 may be between 200 and 1000 mm (millimeters); the second distance D2 may be between 500 and 2000 mm; the third distance D3 may be between 500 and 2000 mm; and the fourth distance D4 may be between 0 and 300 mm. Optionally or additionally, in the closed state (see FIG. 2, and also see FIG. 6) of the door 184, an included angle, e.g., see angle (A), between the first reference line 336 and the second reference line 340 may be between 80 and 100 degrees; an included angle, e.g., see angle (B), between the second reference line 340 and the third reference line 344 may be between 10 and 30 degrees; an included angle, e.g., see angle (C), between the third reference line 344 and the fourth reference line 348 may be between 160 and 180 degrees; and an included angle, e.g., see angle (E), between the fourth reference line 348 and the first reference line 336 may be between 60 and 80 degrees. Optionally or additionally, in the open state of the door 184 (also see FIG. 3), an included angle between the first reference line 336 and the second reference line 340 may remain between 80 and 100 degrees; an included angle between the second reference line 340 and the third reference line 344 may be between 30 and 50 degrees; an included angle between the third reference line 344 and the fourth reference line 348 may be between 80 and 100 degrees; and an included angle between the fourth reference line 348 and the first reference line 336 may be between 150 and 170 degrees. As may be visualized from the schematic line diagram 332 in FIGS. 5 and 6, in the closed state of the door 184, the first reference line 336, the second reference line 340, the third reference line 344, and the fourth reference line 348, together define a generally quadrilateral profile with unequal sides. Also, it may be visualized that the included angle between the first reference line 336 and the second reference line 340 may remain between 80 and 100 degrees in the closed state and in the open state, and throughout the swinging movement of the door 184 between the closed state and the open state.

INDUSTRIAL APPLICABILITY

During operations, an operator may actuate the linkage assembly 124 to extend the dipper 128 towards the material bank 116 and engage the mouth (e.g., an edge or the protruded members 244 at the mouth 196) against the material bank 116 so as to scoop in material from the material bank 116 into the cavity 188. Thereafter, the operator may control the linkage assembly 124 to retract from the material bank 116, pan the dipper 128 over a receptacle (such as a dump body of a dump truck) (not shown), and may unlatch the door 184 to move (i.e., swing out) the door 184 from the closed state to the open state in order to open the port 204. As a result, material from the cavity 188 may be released or dropped into the receptacle (e.g., under the action of gravity) through the port 204. Once the material is released, the door 184 may be returned to the closed state and be latched against the second edge 248 that defines the port 204. As part of a subsequent operational cycle, the operator may actuate the linkage assembly 124 to return to the material bank 116 to scoop in a next batch of material from the material bank 116 into the cavity 188. A latching and an unlatching mechanism of the door 184 may be contemplated by someone ordinarily skilled in the art, and is thus not discussed.

In each operational cycle, as the door 184 is released or unlatched to swing open and move from the closed state to the open state, the direction of the force, F, exerted upon the arm structure 292 by the link structure 296 in response to the swinging movement of the door 184 defines an angle (A) between 80-100 degrees with respect to the axis 326 (e.g., defined along the first reference line 336) or the plane 328 passing through the first axis 312 and the second axis 316 throughout the swinging movement of the door 184. In so doing, portions or components of the force, F, associated with the swinging action of the door 184 majorly passes onto the braking assembly 288, resulting in proper utilization of a torque capacity and a dampening or retarding action offered by the braking assembly 288 of the snubber system 284. Said force, F, is thus is effectively regulated. Further, with the force, F, majorly passing onto the braking assembly 288, relatively negligible portion of the force, F, is passed to any of the body 180 and/or the door 184, thereby keeping the body 180 and/or the door 184 largely secured and unaffected from the repeated swinging action of the door 184, thus prolonging their life.

Additionally, with the proper utilization of the torque capacity offered by the braking assembly 288, only a single snubber system (i.e., the snubber system 284) may be needed to dampen or retard the swinging movement of the door 184, unlike many conventional applications in which at least a pair of snubber systems are required. This reduces the overall cost and eases the machine's operability and serviceability.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A snubber system for retarding a swinging movement of a door of a dipper with respect to a body of the dipper, the snubber system comprising:

a braking assembly configured to be fixedly mounted to the body of the dipper;

an arm structure configured to execute a back and forth rotation about a first axis, the back and forth rotation of the arm structure being dampened by the braking assembly; and a link structure rotatably coupled to the arm structure to rotate with respect to the arm structure about a second axis, the link structure being movable in correspondence with the swinging movement of the door and configured to exert and transfer a force associated with the swinging movement of the door to the arm structure, wherein a direction of the force exerted upon the arm structure by the link structure in response to the swinging movement of the door defines an angle between 80-100 degrees with respect to an axis or a plane passing through the first axis and the second axis at all times throughout the entire swinging movement of the door, wherein the link structure is pivotably coupled to the door to receive the force and rotate with respect to the door about a third axis, and wherein, with the body of the dipper being in an upright orientation, the third axis is movable from below a horizontal plane passing through the first axis under a first condition with the door fully closed to above the horizontal plane passing through the first axis under a second condition with the door fully open, the body of the dipper being at the upright orientation for the first and second conditions such that the horizontal plane is fixed for the first and second conditions.

2. The snubber system of claim 1, wherein a first distance is defined between the first axis and the second axis and a second distance is defined between the second axis and the third axis, the door pivots with respect to the body about a fourth axis, a third distance being defined between the third axis and the fourth axis and a fourth distance being defined between the fourth axis and the first axis, and the braking assembly is the only braking assembly of the snubber system.

3. The snubber system of claim 2, wherein the second distance is more than twice the first distance.

4. The snubber system of claim 2, wherein, in a closed state of the door, the first distance and the fourth distance are shorter than each of the second distance and the third distance.

5. The snubber system of claim 2, wherein, in a closed state of the door, the third distance is more than twice the first distance.

6. The snubber system of claim 2, wherein, in a closed state of the door, the third distance is shorter than the second distance.

7. The snubber system of claim 2, wherein the fourth distance is shorter than the first distance.

8. The snubber system of claim 2, wherein the body defines a cavity, a first end defining a mouth to receive materials into the cavity, a second end opposite to the first end defining a port to release the materials from the cavity, a first outer surface portion disposed at least partially around the cavity and extending between the mouth and the port, a second outer surface portion disposed partially around the cavity and extending between the mouth and the port, the second outer surface portion being located opposite to the first outer surface portion, and the door defines a side surface portion extending along a direction defined between the first outer surface portion and the second outer surface portion when the door is moved to a closed state to close the port, wherein the braking assembly is configured to be fixedly mounted to the first outer surface portion and the link structure is pivotably coupled to the side surface portion of the door to rotate with respect to the door about the third axis.

9. A dipper for a shovel machine, the dipper comprising:

a body defining a cavity, a first end defining a mouth to receive materials into the cavity, a second end opposite to the first end defining a port to release the materials from the cavity;

a door configured to execute a swinging movement with respect to the body to selectively open and close the port; and a snubber system for retarding the swinging movement of the door with respect to the body, the snubber system including:

a braking assembly fixedly mounted to the body of the dipper;

an arm structure configured to execute a back and forth rotation about a first axis, the back and forth rotation of the arm structure being dampened by the braking assembly; and a link structure rotatably coupled to the arm structure to rotate with respect to the arm structure about a second axis, the link structure being movable in correspondence with the swinging movement of the door and configured to exert and transfer a force associated with the swinging movement of the door to the arm structure, wherein a direction of the force exerted upon the arm structure by the link structure in response to the swinging movement of the door defines an angle between 80-100 degrees with respect to an axis or a plane passing through the first axis and the second axis throughout the swinging movement of the door defined by a fully open position of the door and a fully closed position of the door, wherein the link structure is pivotably coupled to a portion of a front surface of the door to receive the force and rotate with respect to the door about a third axis, the portion of the front surface of the door facing directly away from the port and the cavity in the fully closed position of the door, wherein the door pivots with respect to the body about a fourth axis, and wherein in a side profile view of the snubber system the fourth axis is always closer to the first axis than the third axis is to the first axis throughout the swinging movement of the door.

10. The dipper of claim 9, wherein a first distance being defined between the first axis and the second axis and a second distance being defined between the second axis and the third axis, a third distance being defined between the third axis and the fourth axis and a fourth distance being defined between the fourth axis and the first axis, and the third axis is movable from below a horizontal plane passing through the first axis under a first condition with the door in a closed state to above the horizontal plane passing through the first axis under a second condition with the door in an open state.

11. The dipper of claim 10, wherein the second distance is more than twice the first distance.

12. The dipper of claim 10, wherein, when the door is moved to the closed state to close the port, the first distance and the fourth distance are shorter than each of the second distance and the third distance.

13. The dipper of claim 10, wherein, when the door is moved to the closed state to close the port, the third distance is more than twice the first distance.

14. The dipper of claim 10, wherein, when the door is moved to the closed state to close the port, the third distance is shorter than the second distance.

15. The dipper of claim 10, wherein the fourth distance is shorter than the first distance.

16. The dipper of claim 10, wherein the body defines a first outer surface portion disposed at least partially around the cavity and extending between the mouth and the port, a second outer surface portion disposed partially around the cavity and extending between the mouth and the port, the second outer surface portion being located opposite to the first outer surface portion, and the door defines a side surface portion extending along a direction defined between the first outer surface portion and the second outer surface portion when the door is moved to a closed state to close the port, wherein the braking assembly is configured to be fixedly mounted to the first outer surface portion and the link structure is pivotably coupled to the side surface portion of the door to rotate with respect to the door about the third axis.

17. A machine, comprising:

a main frame;

a linkage assembly movably coupled to the main frame; and a dipper movably coupled to the linkage assembly and configured to receive materials from a material bank and transfer the materials into a receptacle, the dipper including:

a body defining a cavity, a first end defining a mouth to receive the materials into the cavity, a second end opposite to the first end defining a port to release the materials from the cavity into the receptacle;

a door configured to execute a swinging movement with respect to the body to open and close the port; and a snubber system for retarding the swinging movement of the door with respect to the body, the snubber system including:

a braking assembly fixedly mounted to the body of the dipper;

an arm structure configured to execute a back and forth rotation about a first axis, the back and forth rotation of the arm structure being dampened by the braking assembly; and a link structure rotatably coupled to the arm structure to rotate with respect to the arm structure about a second axis, the link structure being movable in correspondence with the swinging movement of the door and configured to exert and transfer a force associated with the swinging movement of the door to the arm structure, wherein a direction of the force exerted upon the arm structure by the link structure in response to the swinging movement of the door defines an angle between 80-100 degrees with respect to an axis or a plane passing through the first axis and the second axis throughout the swinging movement of the door, wherein the link structure is pivotably coupled to the door to receive the force and rotate with respect to the door about a third axis, and wherein, with the body of the dipper being in an upright orientation, the third axis is movable from below a horizontal plane passing through the first axis under a first condition with the door fully closed to above the horizontal plane passing through the first axis under a second condition with the door fully open, the body of the dipper being at the upright orientation for the first and second conditions such that the horizontal plane is fixed for the first and second conditions.

18. The machine of claim 17, wherein a first distance being defined between the first axis and the second axis and a second distance being defined between the second axis and the third axis, and the door pivots with respect to the body about a fourth axis, a third distance being defined between the third axis and the fourth axis and a fourth distance being defined between the fourth axis and the first axis, and the braking assembly is the only braking assembly of the snubber system.

19. The machine of claim 18, wherein the second distance is more than twice the first distance, the fourth distance is shorter than the first distance, and when the door is moved to a closed state to close the port, the third distance is more than twice the first distance, the third distance is shorter than the second distance, and the first distance and the fourth distance are shorter than each of the second distance and the third distance.

20. The machine of claim 18, wherein the body defines a first outer surface portion disposed at least partially around the cavity and extending between the mouth and the port, a second outer surface portion disposed partially around the cavity and extending between the mouth and the port, the second outer surface portion being located opposite to the first outer surface portion, and the door defines a side surface portion extending along a direction defined between the first outer surface portion and the second outer surface portion when the door is moved to a closed state to close the port, wherein the braking assembly is configured to be fixedly mounted to the first outer surface portion and the link structure is pivotably coupled to the side surface portion of the door to rotate with respect to the door about the third axis.

* * * * *